Feb. 1, 1938.  R. R. BOSTIC  2,106,993
GAUGE
Filed March 9, 1936   2 Sheets-Sheet 1
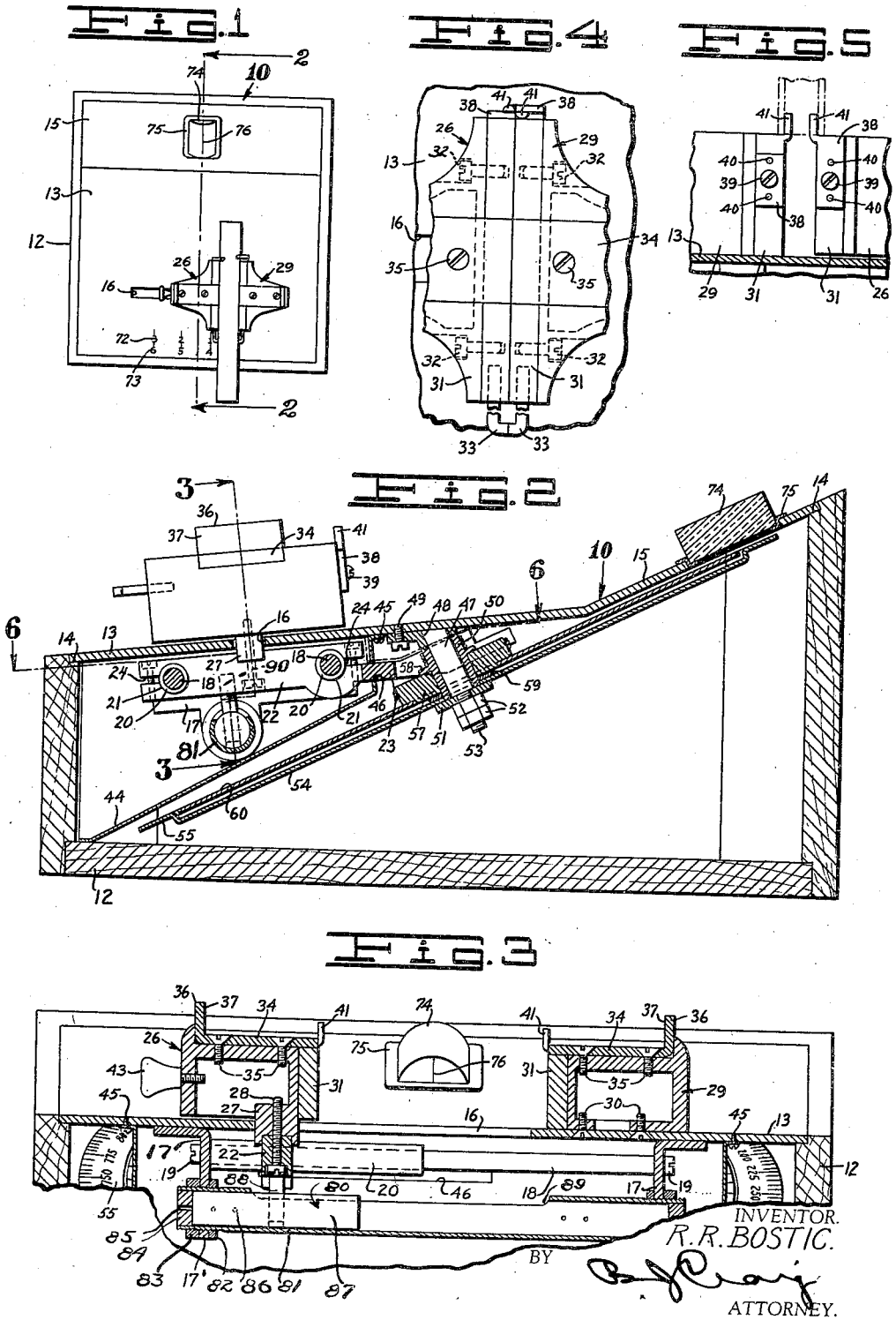
INVENTOR.
R. R. BOSTIC.
BY
ATTORNEY.

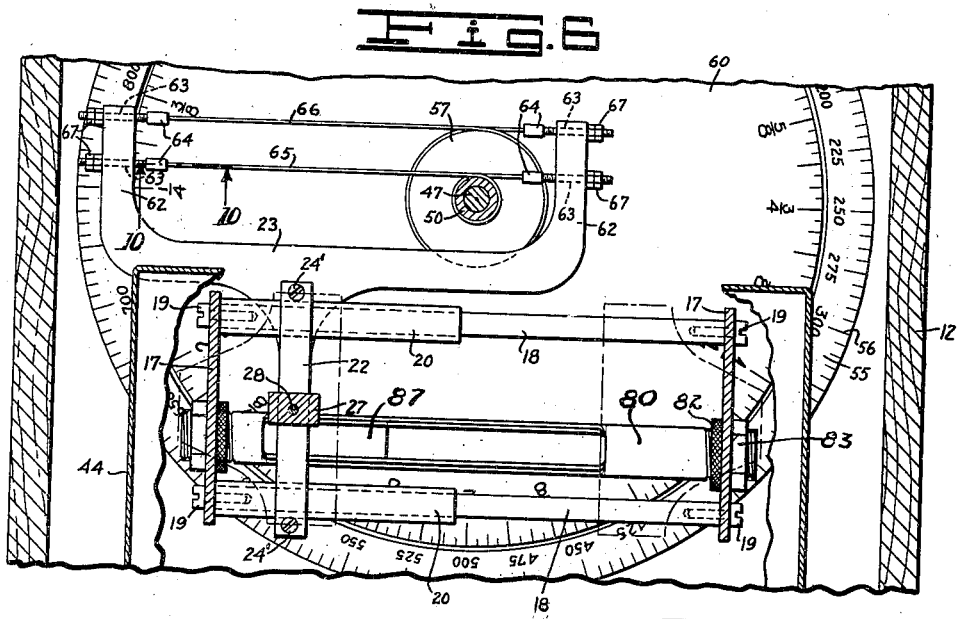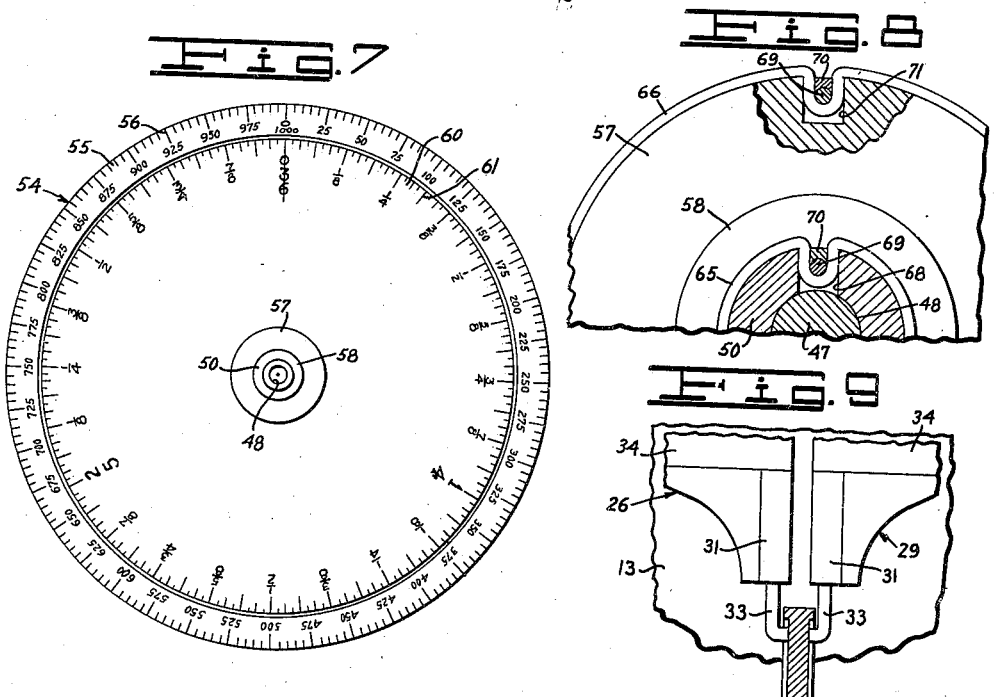

Patented Feb. 1, 1938

2,106,993

UNITED STATES PATENT OFFICE 2,106,993

GAUGE

Ralph R. Bostic, Los Angeles, Calif.

Application March 9, 1936, Serial No. 67,887

8 Claims. (Cl. 33—147)

This invention relates to gauges.

The general object of my invention is to provide a novel gauge which is accurate, easy to operate, and economical to manufacture and which will measure a wide variety of dimensions.

A more specific object is to provide a dial gauge in which novel motion amplifying mechanism is employed.

Further objects and advantages of my invention will be apparent from the following description taken in connection with the accompanying drawings, wherein:

Fig. 1 is a top plan view of my improved gauge;

Fig. 2 is a central section taken on line 2—2 of Fig. 1;

Fig. 3 is a fragmentary section taken on line 3—3 of Fig. 2 showing the construction of the jaws;

Fig. 4 is an enlarged fragmentary plan view showing details of the jaws;

Fig. 5 is a fragmentary detail of the jaws showing the inside measuring pins;

Fig. 6 is a section taken on line 6—6 of Fig. 2 showing my improved motion amplifying apparatus;

Fig. 7 is a plan view of the dials which I employ in my improved gauge;

Fig. 8 is a fragmentary elevation partly in section showing the wire securing device;

Fig. 9 is a fragmentary detail partly in section showing the manner in which the jaw pins engage a recessed article; and Fig. 10 is a section on line 10—10 of Fig. 6.

Referring to the drawings by reference characters I have shown my invention as embodied in a gauge which is indicated generally at 10. As shown the gauge 10 includes a housing 12 which may be made of any suitable material and in any manner. As shown the housing is made of wood and has a top plate 13 suitably secured in recesses 14 therein. The plate 13 includes an upper plane portion 15 which is bent at an angle to the remainder of the plate which is also plane.

The plate 13 is slotted as at 16 and beneath the plate and beyond each end of this slot and transverse to the direction thereof I secure a pair of angle brackets 17. (See Fig. 3.) A pair of ways consisting of parallel rods 18 extend between the brackets and are secured thereto as by screws 19. On each of the rods 18 a tubular slide 20 is positioned. The slides 20 are secured in spaced apertures 21 in a yoke member shown at 22, and which includes a forked arm 23. The yoke is slotted as at 24 and screws 24' extend across the slot to lock the slides in position. (See Fig. 6.)

Positioned above the slot 16 and adapted to move longitudinally thereof I provide a movable gauge jaw 26 having a grip knob 43 at one end and having a depending lug 27 thereon which extends through the slot 16 and is secured to the yoke 22 by a screw 28. The lug is of such length that the jaw 26 is above the plate 13 a slight distance.

A fixed jaw 29 is secured by screws 30 to the plate 13 adjacent one end of the slot 16. The jaws 26 and 30 are preferably made as a one piece casting or forging and are identical except for the manner in which they are mounted and each includes a hardened face plate 31 which is secured to the jaw by screws 32. Each of the plates 31 has a hook member 33 shown as secured thereto although it may be of one piece with the plate or body. (See Fig. 4.) The ends of the hook members 33 are in the same plane as the face of the associated plate 31 and these hook members 33 are adapted to be used as shown in Fig. 9 where a piece of material of I-shape is being gauged to determine the thickness of the web.

An arm 34 is secured in a recess in the upper face of the jaws 26 and 29 by screws 35. Each arm 34 includes an upstanding hardened finger 36 the inner faces 37 of which are a fixed distance beyond the face of the plate 31. Assuming that in the embodiment of my invention here shown this fixed distance is one and one half inches it will be seen that when the plates 31 are a given distance apart, the faces 37 are the given distance plus three inches apart. Thus I am enabled with a three inch jaw movement to provide a measuring range of six inches.

To provide for making internal measurements I secure a plate 38 to the end of each plate 31 as by screws 39 and pins 40. The plates 38 each include an offset finger 41 and one of the plates 38 is also offset laterally from the other plate 38 to provide proper clearance. (See Fig. 4.)

A dust shield 44 may be secured to the plate 13 as by screws 45 and extends downwardly and forwardly to engage the bottom of the housing. The shield 44 is slotted as at 46 to allow the yoke 23 to pass therethrough.

A dial post 47 arranged below the plate 13 has a press fit in a mounting member 48 which is held in place by a screw 49. A collar 50 rotatably mounted on the post 47 is engaged by a washer 51 which is held in place by nuts 52 on a reduced threaded portion 53 of the post 47.

The collar 50 is secured to a dial plate 54 which includes an upraised peripheral portion 55 on which a scale 56 is inscribed. (See Fig. 7.)

A ring member 57 is rotatively secured about the collar 50 below a circumferential flange 58 on the collar 50 and above a washer 59. A dial plate 60 is secured to the ring 57 and has a scale 61 inscribed adjacent the periphery thereof.

The yoke 23 includes a pair of arms 62 which have a pair of aligned threaded apertures 63 therein to receive threaded anchor members 64 to which are secured the ends of flexible member shown as wires 65 and 66, although I may use other flexible members such as small chains, should I so desire. The anchors 64 are provided with suitable lock nuts 67. The wires 65 and 66 are secured to the anchors 64 as by welding as indicated at 67'. (See Fig. 10.)

The flexible member 65 passes about the collar 50 a plurality of times and is secured in a slot 68 therein by a pin 69 which is retained in place by a lead plug 70. Instead of using the pin and plug I may weld or solder the flexible member in place. (See Fig. 8.) The flexible member 66 passes about the ring 57 a number of times and is secured in a slot 71 therein in the same manner as the flexible member 65 is secured to the collar 50.

The diameters of the collar 50 and the ring 57 in the device shown are such that the dial 55 rotates through three times the angle which the dial 60 rotates. As shown in Fig. 7 the scale 56 is calibrated in thousandths reading from 0 to 1000. The scale 61 is calibrated in fractions reading from 1 to 3 inches. The face of the plate 13 is calibrated with a scale 72 calibrated from 0 to 3 inches to indicate the approximate distance between the plates 31, and with a scale 73 calibrated from 3 to 6 inches to indicate the approximate distance between the fingers 36.

A cylindrical lens 74 is mounted in a bezel 75 mounted in the portion 15 of the plate 13 above the scales 56 and 61. A cross hair 76 is positioned across the lens 74 to provide an index against which the scales 56 and 61 may be read.

In using the gauge the object to be measured is placed between the plates 31 or the hooks 33, or about the fingers 41 and the jaw 26 is moved until the object is firmly engaged by the gauge members. The scales appearing through the lens 74 then give the reading of the distance in fractions and in decimals and the scale 72 gives the reading in inches. When a larger object is to be measured it is placed between the fingers 36 and the inch reading is taken on the scale 73 and on the dials.

In order to prevent undue shock when the jaws are moved abruptly, I may provide a dashpot construction indicated generally at 80.

As shown the angle brackets 17 each include a projecting portion 17' provided with opposed apertures through which a tube 81 is inserted. The external surface of this tube at each end is threaded and receives a threaded collar 82 at each end which is in engagement with the inner face of the brackets while a nut 83 engages the outer face of the brackets to hold the parts assembled. Each end of the tube is provided with a plug 84 suitably held in position and provided with a central aperture 85 and with lateral apertures 86. A plunger 87 is mounted to slide in the tube and this plunger is provided with a stem 88 which passes through a slot 89 in the tube and has an upper threaded end 90 which is inserted in a threaded hole in the lower surface of the yoke member 22.

In use, when the jaw is moved in either direction from an intermediate location the plunger 87 enters one of the ends of the tube and compresses the air which passes slowly out the apertures 85 and 86 and serves to cushion the movement.

From the foregoing description it will be apparent that I have provided a novel gauge which is simple in construction and highly efficient in use.

Having thus described my invention I claim:

1. A gauge including a base plate, a fixed jaw mounted on said base plate, a slot in said plate, a pair of angle members secured below said plate at the ends of said slot and extending transverse to said slot, a pair of cylindrical slide members extending between said angle members below and parallel to said slot, a slider on each of said slides, a yoke connecting said sliders, a pair of arms on said yoke, a cylindrical post extending below said plate, a collar rotatively mounted on said post, a ring rotatively mounted on said collar, a dial secured to said collar, a second dial secured to said ring, a pair of flexible members secured to and extending between said arms, a plurality of loops in one of said flexible members engaging said collar, a plurality of loops in the other of said flexible members engaging said ring, and a second jaw positioned above said plate, said second jaw member having a portion thereof extending through said slot and secured to said yoke.

2. A gauge including a base plate, a housing supporting said base plate, a fixed jaw mounted on said base plate, a slot in said plate, a pair of angle members secured below said plate within said housing transverse to and at the ends of said slot, a pair of cylindrical slide members extending between said angle members below and parallel to said slot, a slider on each of said slides, a yoke connecting said sliders, a pair of arms on said yoke, a cylindrical post mounted on and extending below said plate within said housing, a collar rotatively mounted on said post, a dial secured to said collar, a flexible member extending between said arms, a plurality of loops in said flexible member engaging said collar, means to secure a portion of one of said loops to said collar, and a second jaw positioned above said plate and having a portion thereof extending through said slot and secured to said yoke.

3. A gauge including a base plate, a housing supporting said base plate, a fixed jaw mounted on said base plate, a slot in said plate, a pair of angle members secured below said plate within said housing transverse to and at the ends of said slot, a pair of cylindrical slide members extending between said angle members below and parallel to said slot, a slider on each of said slides, a yoke connecting said sliders, a pair of arms on said yoke, a cylindrical post mounted on and extending below said plate within said housing, a collar rotatively mounted on said post, a ring rotatively mounted on said collar, a dial secured to said collar, a dial secured to said ring, a pair of flexible members extending between said arms, a plurality of loops in one of said flexible members engaging said collar, means to secure a portion of one of said loops to said collar, a plurality of loops in the other of said flexible members engaging said ring, means to secure a portion of one of said second loops to said ring, the diameter of said first loops having an elemental ratio to the diameter of said second loops, and a second jaw positioned above said plate and having a portion thereof extending through said slot and secured to said yoke.

4. In a gauge, a housing, a top plate on said housing, said top plate including an inclined lower portion and an inclined upper portion, said upper portion being more steeply inclined than said lower portion, said plate having a slot therein, a pair of ways beneath said plate and parallel to said slot, a slider member mounted on said ways, a jaw member fixed relative to said plate, a second jaw member having a portion thereof extending through said slot and secured to said slider member, said slot being disposed in said lower portion of said top, a dial mounted in said housing, and means whereby movement of said slider member rotates said dial, said upper portion of said top having an aperture therein, said dial being disposed parallel to said upper portion of the top, the dial having indicia thereon readable through said aperture.

5. A gauge including a base plate, a housing supporting said base plate, a fixed jaw mounted on said base plate, said plate having a slot, a pair of slide members mounted below and parallel to said slot, a yoke slidable on said members, a pair of arms on said yoke, a cylindrical post mounted on and extending below said plate within said housing, a pair of dials mounted to rotate on said post, a collar on each dial, a pair of flexible members extending between said arms and looped about said collars, the diameter of one of said collars having an elemental ratio to the diameter of the other collar, and a second jaw positioned above said plate and having a portion thereof extending through said slot and secured to said yoke.

6. A gauge including a support, an anvil fixedly mounted on said support, a pair of spaced fixed slide members mounted on said support, tubular slide members slidable on said slide members, a post mounted on said support, a pair of dials mounted to rotate on said post, a collar on each dial, a pair of spaced anchor members mounted on said tubular slide members and movable with the tubular slide members, a pair of flexible members extending between said anchor members and looped about said collars, the diameter of one of said collars having an elemental ratio to the diameter of the other collar, a second anvil movable towards and from the first mentioned anvil and means whereby said second anvil is moved by said tubular slide members.

7. A gauge including a base plate, a housing supporting said base plate, a fixed jaw mounted on said base plate, said plate having a slot, a pair of slide members mounted below and parallel to said slot, a slider on each of said slides, a yoke connecting said sliders, a pair of arms on said yoke, a cylindrical post mounted on and extending below said plate within said housing, a collar rotatively mounted on said post, a ring rotatively mounted on said collar, a dial secured to said collar, a dial secured to said ring, a pair of flexible members extending between said arms, a plurality of loops in one of said flexible members engaging said collar, means to secure a portion of one of said loops to said collar, a plurality of loops in the other of said flexible members engaging said ring, means to secure a portion of one of said second loops to said ring, the diameter of said first loops having an elemental ratio to the diameter of said second loops, and a second jaw positioned above said plate and having a portion thereof extending through said slot and secured to said yoke.

8. A gauge including a base, a fixed jaw mounted on said base, a yoke member slidably mounted on said base, a pair of spaced arms on said yoke member, a post mounted on said base, a pair of dials mounted to rotate independently on said post, a collar on each dial, a pair of flexible members extending between said arms and looped about said collars, the diameter of one of said collars having an elemental ratio to the diameter of the other collar and a second body pivoted about the base and having a portion thereof secured to said yoke.

RALPH R. BOSTIC.